3,060,224
PREPARATION OF DICYCLOALKYL PHTHALATES

Tracy M. Patrick, Jr., Kirkwood, Mo., and Katharine G. Johnston, Granite City, Ill., assignors to Monsanto Chemical Company, St. Louis, Mo., a corporation of Delaware
No Drawing. Filed Nov. 16, 1960, Ser. No. 69,539
11 Claims. (Cl. 260—475)

This invention relates to improvements in the manufacture of dicycloalkyl phthalates.

Dicycloalkyl phthalates are well known and highly useful chemical substances and in particular are useful as plasticizers for polymeric substances such as polyvinyl chloride and like halogen containing vinylidene resins. It is relatively simple to prepare phthalic acid esters of primary alcohols in good yields and quality necessary for commercial utilization. However, such is not the case with respect to the preparation of phthalic acid esters of secondary alcohols. The direct esterification of a secondary alcohol in the presence of an acid esterification catalyst presents a serious problem both as to yield and quality of the phthalic acid ester product because in addition to esterification, side reactions such as olefin formation always occur. This is particularly true when cycloalkanols are employed in the preparation of their corresponding phthalate esters in the presence of an acid esterification catalyst.

In accordance with this invention there is provided a process whereby phthalate esters of cycloalkanols are obtained in good yields and quality necessary for commercial utilization. In carrying out the process of this invention, the phthalic acid reactant is mixed with an excess of cycloalkanol and heated at atmospheric pressure or at a pressure below atmospheric pressure in the presence of an acid esterification catalyst to a temperature at least sufficient to vaporize the cycloalkanol-water azeotrope. The vapors so produced, which over the course of the reaction comprise cycloalkene (i.e. the olefinic decomposition product of the cycloalkanol used), the cycloalkene-water azeotrope, the cyclo-alkanol-water azeotrope, water and cycloalkanol, are conducted to a cooling zone wherein a substantial proportion of the volatile by-products are separated and discharged from the system. In the cooling zone the temperature is maintained above the condensation point of the cycloalkene but below the condensation point of the cycloalkanol-water azeotrope. The condensate or liquid cycloalkanol fraction, which is the bottoms from the cooling zone and contains cycloalkanol and water, is usually returned directly to the reaction mass, however, it can be conducted to a suitable separator, cooled and the aqueous layer separated from the organic layer. The organic layer, which consists chiefly of cycloalkanol, can be returned to the reaction mass, or if desired, although not necessary, it can be purified by well known methods and then returned to the reaction mass.

It has been found to be particularly advantageous to heat the reaction mass (i.e. the cycloalkanol, phthalic acid reactant and acid esterification catalyst) under reduced pressure to at least the temperature at which the cycloalkanol-water azeotrope boils, introduce the vapors into a fractionating column maintained at a head temperature above the condensation point of the cycloalkene but below the condensation point of the cyclo-alkanol-water azeotrope, the volatile by-products being withdrawn overhead and discarded, while either returning the condensate directly to the reaction mass or withdrawing the condensate from the fractionating column. The condensate when withdrawn can be cooled and stratified to an aqueous layer and an organic layer, and the latter then returned to the reaction mass. In general, the condensate is so rich in cycloalkanol it is returned directly to the reaction mass. In determining the degree of esterification, samples of the reaction mass are removed and evaluated periodically, as for example, by titrating the acidity of the sample.

The following numbered specific examples are intended as illustrations of the process of this invention, and it is not desired or intended that they be a limitation thereon. Unless specified otherwise, the parts disclosed in the following examples are parts by weight.

EXAMPLE I

To a three-neck reaction vessel equipped with a fractionating column, a column head to which a receiver is attached, agitator and thermometers is added substantially 148.1 parts of phthalic anhydride, 270.4 parts of cyclohexanol (35% excess), and 5.5 parts of 96% sulfuric acid. The reaction mass is heated with agitation for a period of about seven and one-half hours at a temperature of 117–125° C. at an absolute pressure of about 170–220 mm. of mercury while maintaining the head temperature in the range of about 55–75° C. at the said pressure. During this heating period the uncondensed vapors consisting chiefly of cyclohexene and water are withdrawn overhead and collected in the receiver attached to the column head, while the condensed vapors (i.e. the column bottoms) consisting chiefly of cyclohexanol are returned directly to the reaction mass. At the end of the heating period vacuum is released and the reaction mass cooled. The cooled mass is washed with aqueous sodium hydroxide to neutralize residual acid and then is followed by a water wash. The so washed mass is then sparged with steam to remove the volatile materials and the residue cooled and dried. The dried product is crystalline dicyclohexyl phthalate whose color of melt is less than 100 Hazen. The yield of dicyclohexyl phthalate based on the phthalic anhydride charged is in excess of 90% by weight.

In order to illustrate the advantages of the instant claimed process over that used heretofore is the following:

Example A

To a three-neck reaction vessel equipped with reflux condenser, a Dean-Stark trap, agitator and thermometer is added substantially 148.1 parts of phthalic anhydride, 270.4 parts of cyclohexanol (35% excess) and 2 ml. of 78% sulfuric acid. The reaction mass is refluxed for a period of about seven and one-half hours at a temperature of about 120–128° C. at an absolute pressure of about 160–200 mm. of mercury while collecting the water by-product in the trap. At the end of the heating period the vacuum is released and the reaction mass cooled. The cooled mass is washed with aqueous sodium carbonate to neutralize the residual acid and then is followed by a water wash. The so washed mass is then sparged with steam to remove the volatile materials and the residue cooled and dried. The so dried product is then admixed with approximately 15 parts of activated charcoal, heated to the molten state, filtered and dried. The so dried product is a crystalline dicyclohexyl phthalate whose color of melt is in excess of 400 Hazen.

When employing a fractionating column it is particularly preferred that an absolute pressure of 100 to 200 mm. of mercury be employed, that a reaction mass temperature in the range of 115–135° C. be used, and that the head temperature in the fractionating column not exceed 65° C./200 mm. It has been found employing these particularly preferred conditions that the condensate can be returned directly to the reaction mass. By so proceeding it has been observed that yields of crystalline dicyclohexyl phthalate, whose color of melt is considerably less than 100 Hazen, in excess of 90% based on phthalic anhydride (or acid) charged are constantly obtained in 7 to 8 hours reaction time. In general, employing this preferred procedure from 5 to 10% of the cyclohexanol charged is converted to cyclohexene which is discharged overhead substantially in total as is the water by-product of the reaction. As illustrative of this particularly preferred embodiment of this invention is the following:

EXAMPLE II

To a three-neck reaction vessel equipped with a fractionating column, a column head to which a receiver is attached, agitator and thermometers, was added substantially 148.1 parts of phthalic anhydride, 270.4 parts of cyclohexanol (35% excess), 2 ml. of 78% sulfuric acid and 0.7 part of activated charcoal. The reaction mass was heated with agitation, vacuum applied and the evolved cyclohexene and cyclohexene-water azeotrope collected in the receiver attached to the column head.

The following observations were made over a period of 450 minutes:

| Time (minutes) | Reaction Mass Temp., °C. | Head Temp., °C. | Absolute Pressure (mm. Hg) |
| --- | --- | --- | --- |
| 0 | 30 | | 200 |
| 11 | 133 | 27 | 200 |
| 36 | 122 | 55 | 200 |
| 57 | 119 | 48 | 200 |
| 83 | 122 | 58 | 200 |
| 150 | 121 | 57 | 200 |
| 207 | 123 | 57 | 200 |
| 260 | 128 | 57 | 178 |
| 301 | 123 | 48 | 170 |
| 363 | 129 | 49 | 162 |
| 389 | 123 | 36 | 136 |
| 450 | 123 | 60 | 50 |

At the end of this period the vacuum was released and the molten reaction mass filtered. 346.4 parts of crude ester was obtained. The crude ester was washed with aqueous sodium carbonate and sparged with steam under reduced pressure to remove the volatile materials. The residue was cooled and then washed with water and dried. The yield of dicyclohexyl phthalate was 92.6% (based on the phthalic anhydride charged) and whose color of melt was 40 Hazen and whose melting point was 63.2–64.0° C.

EXAMPLE III

To a three-necked reaction vessel equipped with a fractionating column, a column head to which a receiver is attached, agitator and thermometers, there was added 278.1 parts of cyclohexanol, 3.6 parts of 96% sulfuric acid, and 166.1 parts of a mixture of phthalic acids, consisting of 25% ortho-phthalic acid, 25% terephthalic acid and 50% of isophthalic acid. Vacuum was applied and the reaction mass was heated with agitation to 125° C. The reaction mass was maintained at a temperature of 117–125° C. and at an absolute pressure of about 170–210 mm. Hg for a period of eight hours while the head temperature was maintained at 60–70° C. The reaction was continued for an additional hour, during which time the head temperature increased gradually to 100° C., while the absolute pressure gradually decreased to 73 mm. Hg. During the reaction, the uncondensed vapors consisting chiefly of cyclohexene and water are withdrawn overhead and collected in a receiver attached to the column head, while the condensed vapors consisting chiefly of cyclohexanol are returned directly to the reaction mass. The reaction mass was cooled below 100° C. under vacuum, the vacuum was released and sodium carbonate was then added in an amount which was sufficient to neutralize the residual acid and the mixture was allowed to settle. The alkaline layer was removed. The crude ester layer was then steam sparged to remove volatiles and subjected to a sodium carbonate wash and two water washes. The washed ester was then dried at reduced pressure. The dried product is a mixture of dicyclohexyl esters of iso-, tere- and ortho-phthalic acids. The yield of neutral ester based on the acid charged was 74%.

Example B

A reaction mass equivalent to that of Example III was charged to a reaction vessel of the type described in Example A. The reaction mass was refluxed for a period of about nine hours at a temperature of about 112–123° C. and at an absolute pressure of about 180–220 mm. Hg while collecting the water by-product in the trap. At the end of the heating period, the vacuum was released and the reaction mass cooled. The cooled mass is washed with aqueous sodium carbonate to neutralize the residual acid and then washed with water. The washed mass was steam sparged to remove volatiles, washed with sodium carbonate and then subjected to two additional water washes. The washed ester was then dried at reduced pressures. The yield of neutral ester based on the acid charged was 61%.

A comparison of the color of the neutral ester products of Examples III and B clearly indicates the superior quality of the product of applicants' process, in that the color of the product of Example III is several hundred points lower on the Hazen scale than the color of the product of Example B.

EXAMPLE IV

Into a suitable reactor there is charged 286.2 parts of phthalic anhydride, 540.8 parts of cyclohexanol, 7.2 parts of sulfuric acid. Vacuum was applied and the reaction mass heated with agitation to a temperature of about 125° C. The vapors produced are passed from the esterification reactor into the bottom of a fractionating column. The upper portion of the column is attached through a vapor line to a partial condenser. To the partial condenser there is attached a vacuum line of a steam jet. The temperature of the vapors leaving the partial condenser is maintained within the range of 50–60° C. at an absolute pressure 150–200 mm. Hg. When operating in this manner, the cyclohexene and cyclohexene-water azeotrope are discharged overhead, while the distillate from the partial condenser which consists essentially of cyclohexanol and cyclohexanol-water azeotrope is passed to a separator where the mixture is allowed to separate into two phases, an upper organic phase and a lower water phase. The upper organic phase is returned to the fractionating column as reflux. The bottoms from the column (sometimes referred to herein as the condensate), which consists essentially of cyclohexanol is returned to the esterification reactor. When a titration indicates that the reaction is essentially complete, the vacuum is released and the reaction mass cooled. The cooled reaction mass is then refined by the procedure described in Example I. Substantially quantitative yields of crystalline dicyclohexyl phthalate are obtained when operating in this manner.

Similar results are obtained when the procedure of Example IV is repeated except that the vapor phase temperature at the top of the column is maintained within the range of 50–60° C. and all of the overhead vapors from the column are condensed, and a major portion of the organic phase of the distillate is returned to the column while a minor portion is withdrawn and discarded.

The term phthalic acid reactant as used herein throughout the specification and claims is meant to include phthalic anhydride, phthalic acid, the cycloalkyl half ester of orthophthalic acid and mixtures of the above including mixtures of iso-, tere- and ortho-phthalic acids, mixtures of iso-phthalic acid and ortho-phthalic acid, etc. The mixture of isomeric phthalic acids resulting from the oxidation of a mixture of isomeric xylenes is a preferred phthalic acid reactant. Even more preferred is the mixture in which the weight proportion of the various isomers is as follows: 25–50% ortho-phthalic acid, 35–50% iso-phthalic acid and 15–25% tere-phthalic acid, in which the iso/tere ratio is at least 2 to 1. Phthalic anhydride is an especially preferred starting material.

By the term cycloalkanol as used herein is meant alicyclic secondary alcohols having five to seven carbon atoms in the ring, e.g. cyclopentanol, 2-methylcyclopentanol, 3-methylcyclopentanol, cyclohexanol, gem. dimethylcyclohexanol, 2,3,5-trimethylcyclohexanol, 3,5-dimethylcyclohexanol, 2-nonylcyclohexanol, 3-dodecylcyclohexanol, 3(2-ethylhexyl) cyclohexanol, 2,3,4,5-tetramethylcyclohexanol, cycloheptanol, 2,4-dimethylcycloheptanol, 2,3,5-trimethylcycloheptanol, etc. The preferred cycloalkanol is cyclohexanol.

With respect to the quantity of cycloalkanol, an excess thereof, e.g. 20–50% above theory, is ordinarily used. It is preferred however, that a 30–40% excess of theory be used.

While sulfuric acid is the preferred catalyst, any of the well known acid catalysts for esterification reactions may be employed, for example para-toluene suffonic acid, alkane sulfonic acids and mixtures thereof, sulfamic acid and the like. Any catalytic amount of the acid esterification catalyst may be employed but in general will be less than 5% by weight of the phthalic anhydride of phthalic acid charged.

While activated charcoal and like adsorptive ingredients may be included in the reaction mass, their presence is not necessary. When such materials are not employed, the filtration step as set forth in Example II is not necessary.

Although it is necessary to heat the reaction mass to at least the temperature at which the cycloalkanol-water azeotrope vaporizes or boils, it is preferred that the temperature of the reaction mass not exceed 180 C. While reaction temperatures of the foregoing range may be employed, such are used provided the cooling zone is maintained at a temperature above the condensation point of the cycloalkene but below the condensation point of the cycloalkanol-water azeotrope.

When carrying out the process of this invention, any suitable apparatus may be used for effecting the fractionation of the vaporous mixture produced in the esterification reaction. One common type involves a vertical column containing packing material, bubble plates or sieve plates. The column itself can be jacketed, and thus provided the means for maintaining the temperature gradient. However, the more common method is to employ a condenser in combination with the fractionating column.

While this invention has been described with respect to certain embodiments, it is not so limited and it is to be understood that variations and modifications thereof obvious to those skilled in the art may be made departing from the spirit or scope of this invention.

This application is a continuation-in-part of application Serial Number 811,254, filed May 6, 1959, now abandoned, which in turn is a continuation-in-part of application Serial Number 688,409, filed October 7, 1957, now abandoned.

What is claimed is:

1. In a process for preparing a dicycloalkyl phthalate wherein each cycloalkyl group has from five to seven carbon atoms in the alicyclic ring, by heating a cycloalkanol selected from the group consisting of unsubstituted cycloalkanols having from five to seven carbon atoms in the alicyclic ring and alkyl substituted cycloalkanols containing up to eighteen carbon atoms with a phthalic acid reactant in the presence of an acid esterification catalyst so as to form a reaction mass wherein there is produced cycloalkene by the dehydration of said cycloalkanol, the steps which comprise heating the reaction mass, at atmospheric pressure and below, to a temperature at least sufficient to form a cycloalkanol-water azeotrope, conducting the vapors so produced to a cooling zone from which liquid cycloalkanol is withdrawn and cycloalkene vapors are withdrawn overhead and discharged from the system.

2. In a process for preparing a dicycloalkyl phthalate wherein each cycloalkyl group has from five to seven carbon atoms in the alicyclic ring, by heating an unsubstituted cycloalkanol having from five to seven carbons in the alicyclic ring with a phthalic acid reactant in the presence of an acid esterification catalyst so as to form a reaction mass wherein there is produced cycloalkene by the dehydration of said cycloalkanol, the steps which comprise heating the reaction mass, at atmospheric pressure and below, to a temperature at least sufficient to form a cycloalkanol-water azeotrope, conducting the vapors so produced to a cooling zone maintained at a temperature above the condensation point of the cycloalkene, but below the condensation point of the cycloalkanol-water azeotrope.

3. The process of claim 2 wherein the phthalic acid reactant is phthalic anhydride.

4. The process of claim 3 wherein the cycloalkanol is cyclohexanol.

5. The process of claim 2 wherein the phthalic acid reactant is a mixture of isomeric phthalic acids.

6. The process of claim 5 wherein the cycloalkanol is cyclohexanol.

7. In a process for preparing a dicycloalkyl phthlate wherein each cycloalkyl group has from five to seven carbon atoms in the alicyclic ring, by heating an unsubstituted cycloalkanol having from five to seven carbon atoms in the alicyclic ring with a phthalic acid reactant in the presence of an acid esterification catalyst so as to form a reaction mass wherein there is produced cycloalkene by the dehydration of said cycloalkanol, the steps which comprise heating the reaction mass under reduced pressure to a temperature at least sufficient to form a cycloalkanol-water azeotrope but not above 180° C., conducting the vapors so produced to a fractionating column maintained at a head temperature above the condensation point of the cycloalkene, but below the condensation point of the cycloalkanol-water azetrope, returning a liquid cycloalkanol fraction to the reaction mass and withdrawing overhead and discharging from the system uncondensed vapors.

8. In a process for the preparation of dicyclohexyl phthalate by heating cyclohexanol with a phthalic acid reactant in the presence of an acid esterification catalyst so as to form a reaction mass wherein there is produced cyclohexene by the dehydration of said cyclohexanol, the steps which comprise heating the reaction mass under reduced pressure to a temperature at least sufficient to form a cyclohexanol-water azeotrope but not above 180° C., conducting the vapors so produced to a fractionating column maintained at a head temperature above the condensation point of the cyclohexene but below the condensation point of the cyclohexanol-water azeotrope, returning a liquid cyclohexanol fraction to the reaction mass and withdrawing overhead and discharging from the system uncondensed vapors.

9. The process of claim 8 wherein the phthalic acid reactant is phthalic anhydride.

10. The process of claim 8 wherein the phthalic acid reactant is a mixture of isomeric phthalic acids containing 25–50% by weight of ortho-phthalic acid, 50–35% by weight of iso-phthalic acid and 25–15% by weight of terephthalic acid in which the weight ratio of iso-phthalic to terephthalic acid is at least 2 to 1.

11. In a process for preparing dicyclohexyl phthalate by heating cyclohexanol with phthalic anhydride in the presence of a catalytic amount of sulfuric acid wherein as a by-product there is produced cyclohexene by dehydration of said cyclohexanol, the steps which comprise heating the reaction mass at an absolute pressure of 100 to 200 mm. mercury to a temperature within the range of 115–135° C., conducting the vapors so produced to a fractionating column maintained at a head temperature not in excess of 65° C. at a pressure of 200 mm. of mercury, withdrawing overhead and discharging from the system uncondensed vapors and returning a liquid cyclohexanol fraction directly to the reaction mass.

References Cited in the file of this patent

FOREIGN PATENTS 701,093    Great Britain _____ Dec. 16, 1953